United States Patent [19]

Wallace

[11] 4,013,616

[45] Mar. 22, 1977

[54] MIXED POLYMERIC STRUCTURAL MATERIAL AND METHOD

[76] Inventor: Richard A. Wallace, 43 Kingscote Garden, Stanford, Calif. 94305

[22] Filed: Sept. 5, 1974

[21] Appl. No.: 503,396

Related U.S. Application Data

[63] Continuation-in-part of Ser. No. 201,111, Nov. 22, 1971, Pat. No. 3,846,366, and a continuation-in-part of Ser. No. 438,235, Jan. 31, 1974, Pat. No. 3,991,005.

[52] U.S. Cl. .......................... 260/42.46; 260/42.47; 260/42.52; 428/2
[51] Int. Cl.² .......................................... C08J 11/04
[58] Field of Search .......... 260/2.3, 37 R, 38, 39 R, 260/42.46, 42.47, 42.52; 106/90, 163; 71/9; 428/2

[56] References Cited

UNITED STATES PATENTS

| 2,044,213 | 6/1936 | Irvine | 260/38 |
|---|---|---|---|
| 2,912,410 | 11/1959 | Cole | 260/42.46 |
| 3,226,318 | 12/1965 | Schick | 260/39 R |
| 3,640,912 | 2/1972 | Reinhard | 260/2.3 |
| 3,718,536 | 2/1973 | Downs et al. | 428/2 |
| 3,734,988 | 5/1973 | Aintablion | 106/90 |
| 3,736,120 | 5/1973 | Tempe | 71/9 |
| 3,819,456 | 6/1974 | Enfield | 428/2 |
| 3,846,366 | 11/1974 | Wallace | 260/42.46 |
| 3,850,771 | 11/1974 | Penque | 106/163 |
| 3,892,706 | 7/1975 | Jetzer | 260/37 R |

FOREIGN PATENTS OR APPLICATIONS

| 1,165,931 | 10/1969 | United Kingdom | 106/90 |

*Primary Examiner*—Donald E. Czaja
*Assistant Examiner*—S. M. Person
*Attorney, Agent, or Firm*—Flehr, Hohbach, Test, Albritton & Herbert

[57] ABSTRACT

A mixed polymeric resin including a comminuted filler from the front end of a solid waste system in a continuous phase of a resinous adhesive binder (e.g., polyethylene). The filler includes glass, cellulose, inorganic oxides and mixed polymer resins. A method for forming the filled resin.

20 Claims, No Drawings

MIXED POLYMERIC STRUCTURAL MATERIAL AND METHOD

CROSS-REFERENCE TO RELATED APPLICATIONS

This application is a continuation-in-part of my co-pending U.S. applications Ser. No. 201,111, filed Nov. 22, 1971, now U.S. Pat. No. 3,846,366 and Ser. No. 438,235, filed Jan. 31, 1974, now U.S. Pat. No. 3,991,005.

BACKGROUND OF THE INVENTION

A number of cast resinous objects have been produced which employ inert fillers dispersed throughout a thermosetting resin such as polyester. Known filler materials include calcium carbonate, glass fibers, asbestos, cinders, silicates, metal powders, quartz, clay, sand, alumina, volcanic ash, and the like.

There is a need for economic disposal of the by-products of a solids waste treatment plant for industrial or municipal garbage. In my co-pending application Ser. No. 201,111, a process is described for forming a valuable structural material using the incineration or pyrolysis residue of industrial or municipal solid waste products as a particulate reinforcement filler mixed with a resinous adhesive polymer binder which bonds the filler particles together. In my application Ser. No. 438,235, filed Jan. 31, 1974, a process described in which the fine waste residues of combustion processes are employed as particulate reinforcement filler when mixed with similar adhesive resinous polymer binders.

Another problem in a solids waste disposal system is the economic use of products of the so-called front-end system. As defined herein, such front-end resources recovery systems include any fraction from a municipal trash solids handling system which has been comminuted and classified but not pyrolyzed or incinerated. Such operations produce many different inorganic and combustible organic residues or rejects which are conventionally employed as land fill or directed to pyrolysis or incineration operations.

One reason why the shredded polymer-rich residue from a front-end system would form a poor material by itself is that it contains a number of mixed polymers which are incompatible with each other, for example, polyethylene and polyvinyl chloride. When these polymers are melt blended, the product appears striated or layered, is fibrillated and has inferior physical properties and poor structural integrity. When blends of these polymers are mixed without segregation, they have poor elongation properties and are cheesy and brittle.

SUMMARY OF THE INVENTION AND OBJECTS

It is a general object of the present invention to provide a valuable structural material using inexpensive front-end waste residue as a polymer filler to reduce the problems of disposing of the residue.

It is a further object of the invention to provide compositions of the foregoing type capable of use in applications such as sewer pipes, sub-irrigation pipes, rubber hoses, filled rubber footwear heels, fence posts, furniture, floor coverings, and extruded telephone and power-cable ducts, as well as wood, stone, and concrete substitutes, filled rubber products such as vehicle tires, and battery cases.

It is another object of the invention to convert the mixed polymer containing front-end residue into a composition of superior structural strength.

In accordance with the above objects, a comminuted filler is mixed with flowable castable thermoplastic, thermosetting or elastomeric polymer. The filler comprises an unpyrolyzed, unincinerated comminuted fraction from a front-end resource recovery system including glass, cellulose and its derivatives, inorganic oxides and mixed polymer resins.

The filled resin binder is formed or molded into a desired shape and solidified. The process can be carried out directly at the waste treatment plant to avoid costly shipment costs. In the final products, the polymeric binder is adhesively bonded to the filler particles.

Applicant has discovered a technique for overcoming the foregoing problems of a mixed incompatible resin component of the front-end fraction being present in large quantities. The binder is selected to be polyethylene or a polyethylene-compatible polymer such as ethylene-propylene rubber or mixtures of the same. By polyethylene-compatible is meant a polymer essentially miscible in polyethylene. This is the preferred binder for a front-end filler of high mixed resin content because it incorporates the most prevalent of the mixed resin, polyethylene, as a portion of the binder.

Another feature of the invention to overcome the structural weakness from polymer incompatibility is to dilute the mixed polymer front-end fraction with a glass-rich front-end fraction prior to intimate mixing with the binder. As used herein, a glass-rich fraction comprises a majority of glass. In this manner, the polymers incompatible with polyethylene and present in relatively high proportion in the mixed resin content are diluted to below a level at which it can form an interface with the binder of sufficient length to provide a significant weakened fault line in the composition. For this purpose, no single resin incompatible with polyethylene, e.g., polyvinyl chloride, is present in an amount greater than about 12%.

In the process for forming the polymeric composition, municipal or industrial solid waste is comminuted as by shredding or liquid agitation and then classified, conventionally by air classification, into a light fraction and a heavy fraction. The light fraction comprises a majority of combustible organic materials. The heavy fraction, or a screen-sized portion thereof, referred to herein as the first glass-rich fraction, typically comprises a majority of glass and inorganic oxides and a minor portion of mixed resins and cellulose. Either the light or heavy fraction may be employed as a filler according to the present invention by intimately mixing a portion of the same in the unpyrolyzed, unincinerated state with sufficient castable resin binder to form a continuous phase capable of firmly bonding the filler. Thereafter, the mixture is formed into a desired configuration while in a flowable state and the binder is solidified.

DETAILED DESCRIPTION OF THE PREFERRED EMBODIMENTS

The present invention is predicated upon the discovery that the shredded front-end residue of industrial or municipal solid waste products is an excellent reinforcement filler material when intimately mixed with an adhesive resinous polymer binder.

In performing the process of the present invention, the comminuted fraction from a front-end system is mixed with 10 to 90% by weight of a flowable castable resin binder. Thereafter, the mixture is formed into a desired configuration, as by molding or extrusion, and the binder is solidified to form a solid composition in which the binder is adhesively bonded to the filler particles. For purposes of the present description, the designated content of binder in the overall composition includes that resin comprising the continuous phase of the composition regardless of its source. That is, it includes auxiliary or secondary resin binder added to the front-end filler as well as the portion of resin miscible in the binder forming the continuous phase. For example, where polyethylene is employed as the binder, the composition includes the total quantity of polyethylene contained in the mixed resin portion of the filler and that added as auxiliary binder.

It has been found that almost all solid streams removed from a front-end system can be employed as filler in accordance with the present invention. A typical generalized front-end system is described in a publication entitled, "NCRR Materials Recovery Test Program New Castle County, Delaware Fall-Winter, 1973". In accordance with this system mixed refuse is comminuted as by shredding or by granulating into pieces of a size on the order of ⅛ inch to ½ inch. Thereafter, the comminuted garbage is classified, as in a conventional air classifier in which it is passed through a moving column of air. The light fraction generally comprises a majority of combustible organic materials including film plastics, cellulose and its derivatives, and the like. The heavy fraction generally comprising glass, stones, dense metals, dense plastics, wood, rubber, and putrescible organic materials.

A typical composition of municipal solids waste stream fed to the front-end system is set forth in the following table.

TABLE 1

| Paper | 43% |
|---|---|
| Glass | 10% |
| Ferrous Materials | 8% |
| Aluminum | 0.7% |
| Non-ferrous materials | 0.3% |
| Textiles | 2.0% |
| Rubber | 1.0% |
| Plastics | 2.0% |
| Other | 33% |

A typical light fraction includes 70% cellulosics material, 10% mixed polymer resins and 20% inorganics.

A typical heavy fraction is a composition set forth in the following table.

TABLE 2

| Metals | 53–70% |
|---|---|
| Glass and Rock | 20–40% |
| Putrescible Organic Material | 2–6% |
| Rubber | 1–3% |
| Plastics | 1–2% |
| Wood | 1–5% |
| Other organics (paper and leather) | 1–3% |
| Sand | 1–3% |

A typical approximate analysis of the thermoplastic polymer portion of the foregoing heavy fraction for municipal or industrial refuse waste is set forth in the following table.

TABLE 3

| | Percent by Weight |
|---|---|
| Low Density Polyethylene | 32%* |
| High Density Polyethylene | 8.5%* |
| Polypropylene | 13% |
| Styrene-containing Plastics | 18% |
| Polyvinyl Chloride | 28.5% |

*including ethylene-vinyl acetate co-polymer

Typically, the polymeric portion of the heavy fraction comprises 80% by weight of thermoplastic polymer and 20% by weight of thermosetting polymer (e.g., urea, urea-formaldehyde, phenolics, epoxy, polyesters, and the like). The above composition of the polymers in the various front-end fractions derived from the heavy fraction does not vary to a significant extent.

After air classification, the light fraction is generally either incinerated or pyrolyzed to recover its fuel content or is employed as land fill.

The heavy fraction from air classification is then conventionally conveyed past a magnetic separator to remove the ferrous metals. The non-magnetic portion of the heavy fraction is conventionally passed over a dry screen to remove items such as aluminum, glass, and the like. The remaining non-magnetic fraction is conventionally passed to a rising current separator where food wastes, heavy plastics, and the like not removed in the air classifier are floated off in a current of water. This glass-rich fraction conventionally comprises the following components: glass (60–65%), metals and inorganic oxides (20%), cellulose (10%), plastics (10%), and some putrescible materials. Part of the rising current separator stream is shredded again and passed through the rising current.

The heavier sink portions from the rising current separator, containing most of the aluminum and other non-ferrous metals, can pass to a heavy media separator containing a high density fluid. Here, the aluminum floats and other metals sink.

This glass-rich fraction may then be further separated into a cellulosic-rich fraction and a second glass-rich fraction. The former fraction comprises a majority of cellulose.

A detailed specific front-end system using the Garrett process is described in a paper entitled "Glass Recovery From Municipal Trash by Froth Flotation" presented at the proceedings of the Third Mineral Waste Utilization Symposium (Chicago, Ill., March 14–16, 1972) by Garrett Research and Development Co., incorporated at this point by reference. The heavy fraction or underflow from the classifier is screened at, say, ¼ inch mesh and most metal, wood and the like are removed as oversize. The undersize is pulped in water and the sink material ground in a rodmill and screened with removal of the +8 mesh fraction (containing metal, plastic and rubber). The −8 mesh material containing ground glass, bricks, bones, stones, ceramics, plastics, ash and slag is milled to −32 mesh and classified to remove the −200 mesh fines which is thickened and dried. The last-named fines are termed "slimes". The −32 +200 mesh fraction is repulped and fed to a flotation cell from which the flotation product and sink product, termed "flotation tailings", are removed and de-watered. The de-watered slimes have an average mesh size of −200+600 and typically comprise about 70% glass, 20% old bricks, cement, dirt, and the remaining 10% include plastics and wood fibers. The flotation tailings is comprised principally of rock, brick, ceramic and other inorganics.

Any of the foregoing front-end fractions may be employed as the total or a portion of the filler in accordance with the present invention. Where the fraction employed includes a polymer content below a level to be set forth hereinafter, any common resin adhesive thermoplastic, thermosetting or elastomeric polymer may be employed as the binder of the present invention so long as it is flowable or fluid during mixing with fillers so that the composition may be formed into the desired configuration. Also, it must be capable of adhesively bonding with the filler particles to form a solid composition with good structural strength upon solidification.

Thermosetting resin suitable for the present invention include epoxy resins formed from a mixture of epichlorohydrin and bisphenol, phenolic resins formed from formaldehyde and phenol, polyesters formed from a mixture of a polyfunctional alcohol and a polyfunctional acid. Other thermosetting resins which may be employed of the thermosetting type are aminos, alkyds, urethanes, silicones, cross-linked polyethylene, and the like.

A listing of polyester resin particularly suitable for the purpose of the present invention is described in the chapter entitled "Polyesters" by Edward H. Meyer, *Modern Plastics Encyclopedia*, issue for 1965, September 1964 pp. 235–240 and the references cited therein and "Polyesters and Their Applications" by Bjorksten et al, Reinhold, N.Y., 1965.

Suitable castable polyesters comprise a solution in styrene of the esterification product of a glycol, such as propylene glycol and dibasic acids. The dibasic acids include phthalic anhydride, or isophthalic acid and maleic anhydride. When properly catalyzed with a peroxide, such as benzoyl peroxide or methylethylketone peroxide, the styrene reacts with the unsaturated maleic groups to form the thermoset resins. Only small amounts of catalyst, in the range of 0.5 to 1.0%, are employed.

Particularly effective phenolic resins have a molar ratio of formaldehyde to phenol in an approximate ratio of from 2 to 3 parts to 1. These resins may be slowly cured by heating for 1 to 3 days at 70°–80° C or may be cured more rapidly (e.g., from 1–4 hours) at 20° C by the addition of small amounts (e.g., 1–5%) of acid.

If desired, the filler material of the present invention may be employed to reinforce a thermoplastic resin binder. Suitable ones include nylon, polycarbonates, acrylics, polymethyl methacrylate, acetals, vinyls, polyvinyl chloride, cellulosics, polystyrene, chlorinated polyethers, fluorocarbons, polypropylene, high and low density polyethylene, polyurethane, styrene-butadiene-ethylene or propylene rubber blend, polyisobutylene and styrene-butadiene rubbers, phenylene oxides, polysulfones, coumarone, and block or graft copolymers, and any other mixture or blend of the foregoing filled polymers.

Molding techniques for the above filled polymers include conventional injection molding or extrusion as with a multi-screw vented extruder.

Filled polymer composition uses of the present invention are well suited to continuous molding. In suitable continuous injection molding operations especially adapted for thermoplastic polymer, the fine particulate filler is fed continuously into the feed section or hopper of the molding apparatus and admixed with the polymer under sufficient heat to soften the polymer, typically in granular form, into fluidity.

After being formed into a desired configuration, the polymer is cooled to room temperature and solidified. In this type of molding, a thermoplastic resin of one of the foregoing types comprise the flowable castable resin binder of the present invention.

Flowable castable resin binder in the present application also includes polymerizable resin binder precursors of the thermoplastic or thermosetting type which are flowable prior to polymerization and solidify after polymerization. The molding techniques for such materials are generally non-continuous and include filling a mold of a desired configuration with the flowable resin binder precursor intimately mixed with filler and then allowing the mix to solidify.

It has been found that a desired color may be imparted to a composition of the foregoing type by the addition of a suitable pigment. For example, the composition may be colored red by the addition of iron oxide, white by the addition of titanium oxide, blue by the addition of phthalocyanine blue, green by the addition of phthalocyanine green, and so forth. It has been found that a relatively small percent of pigment, on the order of ½% or less, is sufficient to impart the desired color to the entire composition. The pigment is added to the binder and filler in the mixing stage. It is noted that the blended coloring effects of conventional synthetic marble may be obtained using a composition of the present invention.

The final composition of the present invention is characterized by high flexural, tensile, compressive and impact strength set forth in detail hereinafter. In addition, it is exceptionally resistant to acid and, in general, to other corrosive chemicals. The surface is characterized by relatively high hardness and is easily machinable. Furthermore, the final composition will be formed with a smoothness comparable to that of the mold.

A typical elastomeric polymer binder for use in the present invention include ethylene-propylene rubber, styrenebutadiene, natural rubber and polychloroprene.

The amount of binder is sufficient to form a continuous phase firmly bonding the filler particles. For this purpose, the binder typically comprises 10 to 90% by weight of the composition depending upon the economics and desired properties of the product. In such compositions, the total polymer resin content comprises about 20 to 75% by weight.

Where the front-end resource recovery residue fraction is plastics-rich, the choice of polymeric resin binder is limited to one that is compatible with polyethylene. It is important that no single polymeric resin incompatible with polyethylene be present in the final composition in sufficient quantities to form an interface with the binder or sufficient length to provide a significant weakened fault line. That is, no single resin incompatible with polyethylene, such as polyvinyl chloride, should be present in an amount greater than about 5–12%. Polyethylene compatible polymers include ethylene-propylene rubber and polyethylene. It has been found that where the polyethylene-incompatible material is retained below this level, and is intimately dispersed throughout the continuous binder phase, it performs like an inert filler material instead of forming such structure weakening fault lines.

Where the binder is of the thermoplastic or elastomeric type, the material employed may be (a) prime quality virgin polymer, (b) off-grade virgin polymer, or (c) scrap polymer. Thus, for example, where polyethylene is employed as the binder, inexpensive scrap film polyethylene may be employed.

The total plastics content averages about 2% in municipal solid wastes. However, in cities such as New York, it can be as high as 5%. On the other hand, industrial solid wastes may have considerably higher plastics proportions, from 10 to nearly 100%, for example, in a plastics manufacturing facility.

Where a mixed polymer resin-rich fraction is employed, the total content of resin incompatible with polyethylene, e.g., polyvinyl chloride, is reduced to below the above described detrimental level. As used herein, a mixed polymer resin-rich fraction includes at least 10% polymer resin. The reduction can be accomplished by mixing this fraction with, for example, a glass-rich fraction of the foregoing type. A suitable mixture includes (a) 10 to 50% of a mixed polymer-rich fraction, (b) 50 to 90% of a glass-rich fraction and (c) 5 to 10% of polyethylene-compatible binder. For example, 30% by weight of the plastics-rich heavy fraction can be mixed with 50% by weight of a glass-rich fraction including only trace amounts polymer and 20% by weight of auxiliary polyethylene or ethylene-propylene rubber to form a final composition comprising 50% non-polymer front-end filler, 27% polyethylene, 5% thermosetting resin, and 18% thermoplastic resin and cellulosic fibers. This composition does not include sufficient quantities of polyvinyl chloride to be detrimental to the physical properties of the polymer.

A cellulosics-rich fraction derived from the light or heavy fraction in the manner described above includes a majority of cellulosic fibers and generally comprise 70 to 90% cellulosic material and 5 to 15% polymeric resin. It may be employed as the filler alone since cellulose is a sufficient diluent that no single polymer resin incompatible with polyethylene is present in sufficient quantities to form a fault line. However, it may be desirable to mix a glass-rich fraction to improve the structural properties of the material.

The polymer filler may comprise 1–80% glass or 1–80% cellulose or its derivatives.

In order to illustrate the present invention, specific examples are hereinafter given. This is done by way of example and is not intended to limit the scope of the appended claims. Parts are expressed in terms of parts by weight. To avoid repetition, unless otherwise expressed, when thermoplastic resins are employed as binder, the binder is mixed with filler at elevated temperatures sufficient to maintain the resin in a flowable state and the mixture is molded in a conventional manner. Thereafter, the mixture is cooled to room temperature and the binder is solidified.

Although specific front-end garbage fractions have been set forth herein, it should be understood that any fraction from a variation of front-end processing may be employed within the scope of the present invention as set forth in the claims. Also, the comminuted, unclassified municipal or industrial solid waste may be employed.

EXAMPLE 1

Incoming refuse is directly fed to several wet pulping machines used in the Black-Clawson waste treatment system of a type installed in Franklin, Ohio and Hempstead, Long Island. Water is admixed with the refuse to produce a 3.5% slurry. After metals and glass are separated, centrifugal washes are used to clean the fiber-containing slurry. Long cellulosic fibers of paper-making quality are then removed by passing the slurry over a slotted fine screen.

This cellulosic-rich fraction has the following approximate composition: 90% cellulosics, 5% fine glass, and 5% synthetic fibers and light plastics and has a size ranging from −400 mesh to +8 mesh. It is intimately mixed and compounded at 350° F with an oil-extended ethylene-propylene rubber in a Banbury or other high shear mixing technique in proportions of 250 parts of cellulose-rich filler to 100 parts of ethylene-propylene rubber. This is followed by an injection molding or compression molding press. It is characterized by a high tensile strength of 2,200 psi and a total elongation of 300%. This reinforced rubber possessed excellent resilience and an 85 shore A hardness.

EXAMPLE 2

The cellulosics-rich fraction of Example 1 is employed as a filler in a thermosetting phenol-furfural resin. An in-line, thermoset continuous molding press is utilized. This press provides the advantage of screw transfer molding and fast production cycle times of about six seconds. A compression pressure of 5,000 psi and a temperature of 385° F is used to mold a 60% cellulosics-rich fraction and 40% phenol-furfural molding compound. A strong interfacial bonding between the resin and the filler fiber components was formed even though the fibers were contaminated with oil and grease. A tensile strength of 6,600 psi and a compression strength of 33,000 psi were measured.

EXAMPLE 3

In the Black-Clawson process of Example 1, after removal of the cellulosics-rich fraction, a wet glass-rich rejection fraction is recovered from the slurry by a liquid cyclone, and comprises about 80% glass and 20% mixed plastics, leather and short-length cellulosics. This glass-rich fraction is dewatered and continuously screened into a size range from 1½ inch to ⅛ inch. This fraction is then pulverized and classified into a composition set forth in Table 4.

TABLE 4

| Dry Reject Glass-Rich Fraction (−50 +350 mesh) | |
|---|---|
| Component | Approximate Percentage |
| Glass | 80 |
| Cellulosic short-length fibers from wood and paper* | 8 |
| Synthetic polymeric short fibers and particles* | 2 |
| Rubber and leather | 2 |
| Inorganic oxides from ground bricks, cement, and metallic objects | 8 |

*fiber content contaminated with oil, grease and dirt.

50% by weight of this glass-rich fraction is intimately dispersed into low-density polyethylene at 340° F and injection molded. The mechanical properties of this filled polyethylene are set forth in Table 5.

TABLE 5

Mechanical Properties of 50% by Weight of Black-Clawson's Reject Glass-Rich Fraction (−50+350 mesh) - Filled Polyethylene

| | |
|---|---|
| Tensile Strength | 3,300 psi |
| Impact Strength | 3.8 ft-lb/inch |
| Increase of Heat Distortion Temperature Over Unfilled Low-Density Polyethylene | 155° F |

The reinforcing effect on the reject glass-rich fraction on the tensile strength and impact resistance of polyethylene is evident. This filled polyethylene is highly creep resistant and retains its rigidity at 200° F compared to 155° F for unfilled polyethylene.

EXAMPLE 4

In the Black-Clawson process of Example 1 a dried short-length cellulosics-rich fraction (approximately −50+350 mesh) is separated by screening. This fraction is incorporated as a filler in phenol-formaldehyde molding resin at a 60% filler loading. The composite is compression molded at 390° F and a pressure of 4,500 psi. The mechanical properties are set forth in Table 6.

TABLE 6

| | |
|---|---|
| Tensile Strength | 8,700 psi |
| Compression Strength | 27,000 psi |
| Flexural Yield Strength | 12,500 psi |
| Impact Strength | 0.70 ft-lb/inch |

EXAMPLE 5

A cellulosics-rich fraction is generated from a municipal solid waste facility and has a composition set forth in Table 7. It is incorporated into phenol-furfural molding resin compound. The highly filled furfural resin is injection molded at 420° F and at a 17,000 psi pressure.

TABLE 7

Dry Reject Cellulosics-Rich Fraction (−50+350 mesh) Obtained from Black-Clawson's Screening Operation

| Component | Approximate Percentage |
|---|---|
| Cellulosics (short-length) | 75 |
| Synthetic fibers | 7 |
| Glass | 13 |
| Metals and metal oxides | 5 |

EXAMPLE 6

A shredded, cellulosics-rich front-end residue stream comprises 60% cellulosics and about 40% of waste glass, metal oxides and film plastics. This light fraction is obtained as the light fraction overhead from an air classifier. Another scrap fraction comprising 70% finely shredded cellulosics and 20% synthetic fibers and 10% fine glass and metal oxides was also obtained as the light fraction from a resource recovery facility treating industrial solid wastes. On two separate runs, 50 parts by weight of this finely divided residue, approximately 100 mesh, is incorporated into (a) 50 parts of phenol-formaldehyde and (b) 50 parts of phenol-furfural molding compounds. These mixed particulate and fibrous fillers greatly increased the impact resistance and dimensional stability of these compression molded or injection molded products.

EXAMPLE 7

Waste cellulosics-rich stream comprising 85% cellulosics, 10% glass and 5% mixed plastics (mostly 100 mesh size range) is obtained as the light fraction overhead from a zig-zag air classifier. In separate experiments, it is incorporated in a 50:50 ratio by weight into phenylene oxide. The tensile modulus was approximately three times the value for the base phenylene oxide thermoplastic. Dimensional stability of this composite was also greatly improved.

The same filler was incorporated at the same loading into nylon 6. The tensile strength was found to be 19,000 psi and the impact strength (notched Izod) was 1.8 ft.-lbs/inch.

EXAMPLE 8

In a solid waste disposal system developed by Combustion Power Company, Menlo Park, California, municipal waste is shredded and then pneumatically conveyed through an air classifier. The lighter fraction (about 85%), which is predominantly paper and film plastics, is conventionally combusted in the fluid bed incinerator. The heavier fraction (about 15%) contains materials, such as glass, metals, dense plastics, rubbers, and cellulosics, and small amounts of assorted trash, dirt, rock and rags. The aluminum and ferrous metals are separated out. The remaining glass-rich waste fraction is milled or ground to a finely divided state. This unsorted finely divided glass-rich fraction includes various scrap plastics (approximately 80% thermoplastics and 20% thermosetting), cellulosics, synthetic fibers, leather, ground rock, inorganic oxides and metals.

This finely divided (−50+400 mesh) glass-rich fraction containing approximately 65% glass, 5% various plastics and 13% mixed cellulosics and leather, 14% non-recoverable metals and metallic oxides, and 3% residue comprising dirt, putrescible material, and powdered composites.

This glass-rich fraction is intimately mixed with low-density polyethylene in a one to one ratio by weight and molded at 340° F in a multi-screw extruder and allowed to cool to form the reinforced polyethylene product.

The heat distortion temperature of this increased by 170° F to 265° F over the unfilled off-grade virgin low-density polyethylene. The tensile strength (3,000 psi) is an increase of nearly 200% over the unfilled polyethylene. Thus, the glass-rich fraction served as an excellent reinforcing filler, resin extender and control diluent.

The light fraction which is predominantly shredded film plastics and cellulosics is found to be an excellent mechanical and structural reinforcing agent when incorporated in common thermosetting polymers.

EXAMPLE 9

60 parts of the above finely-divided glass-rich waste fraction of Example 8 is compounded and dispersed into 40 parts of oil-extended ethylene-propylene copolymer elastomer. The resulting extruded filled rubber has greatly improved physical properties, such as tensile strength, improved creep-resistance, dimensional stability and modulus. Increasing amounts of this front-end mix filler causes continuing improvement in physical properties until a maximum percentage is attained of eighty-five percent.

EXAMPLE 10

This example uses a filler a finely divided front-end residue comprising a glass-rich mixture of various plastics and mixed cellulosics, metals and metallic oxides of a composition set forth in Table 8. This filler (80 parts) is admixed with an oil-extended ethylene-propylene rubber (60% ethylene and 40% propylene). The rubber is compounded with the filler in its finely divided state in a high-shear mixer and fed into (a) a continuous twin-screw extruder to fabricate garden hose and (b) in an injection molding machine to produce shoe heels and footwear. The tensile strength is greatly improved, increasing from a value of 600 psi for the unfilled ethylene-propylene random copolymer to 2,800 psi for the reinforced 80% filled rubber composite. The abrasion resistance, dimensional stability, and hardness are substantially enhanced.

TABLE 8

Dry Reject Glass-Rich Fraction (Average 150 mesh) Obtained from Front-End Operation of Municipal Solid Waste System

| Component | Approximate Percentage |
| --- | --- |
| Glass | 65 |
| Mixed plastics and fibers | 12 |
| Cellulosics | 9 |
| Metals and metal oxides | 10 |
| Putrescible material | 4 |

EXAMPLE 11

In the front-end system of the Garrett Research and Development Company, La Verne, California, the solids refuse is initially shredded and fed into an air classifier in which the shredded refuse is separated into inerts and moisture from the organic fraction. Ferrous metals are magnetically removed and glass is removed by a froth-flotation subsystem. The organics-rich fraction comprising 85 percent organics is then passed through a secondary shredder reducing it to about −50 mesh size particles. This Garrett pyrolysis process has been presented by G. M. Mallan and C. S. Finney at the 73rd National Meeting of American Institute of Chemical Engineers, in a paper entitled "New Techniques in the Pyrolysis of Solid Wastes", incorporated at this point by reference. A residue of dried −200+600 mesh size glass-rich fraction comprising glass (about 75%), small amounts of powdered brick, cement, etc. (about 10%), various plastics (about 5%) and fibrous cellulosics (about 10%) is generated in the front-end operation of the Garrett process.

Fibrous cellulosics are extracted along with inorganic inerts prior to pyrolysis in a mixed glass-rich stream comprising about 20% cellulosics and plastics and about 8% glass, rocks, dirt, metal oxides and organics. The size range varies between −9+20 mesh, typically 65% −20+48 mesh. This material is incorporated into polyethylene at a 50% loading and exhibits excellent mechanic reinforcement.

EXAMPLE 12

A waste glass-rich stream whose mesh size is −8+20 mesh, mostly −50+200 mesh was obtained from a continuous air gravity table separation in the front-end section of the Garrett Research pyrolysis system. This fine glass-rich fraction comprising about 70% inorganics, such as ground glass, rock, ash, etc, and about 30% various shredded plastics, rubbers, and fibrous cellulosics and synthetics.

This glass-rich residue (60 parts by weight) is incorporated into 40 parts by weight of low-density polyethylene. The filled polyethylene is extruded, cut into chips or pellets, and then bagged.

EXAMPLE 13

The National Center for Resource Recovery's front-end system is expected to mechanically separate 650 tons per day of New Orleans' residual refuse. After the incoming mixed refuse is shredded, it is air classified into light materials, such as paper, film plastics, lawn clippings, and heavy materials, such as metals, glass, stones and some food wastes (approximate composition). The light materials are removed for disposal or energy recovery. Alternatively, this primarily organics fraction (91% shredded cellulosics and mixed plastics, including other organic materials, plus 9% inorganics) is found to yield an excellent reinforced polymer composite engineering material.

The heavy fraction is further processed. The ferrous metal and large pieces of aluminum and glass are first removed. The remaining non-ferrous fraction is passed through a rising water current separator where food wastes, heavy plastics, rubber, etc. are floated off in the water current, to form a plastics-rich fraction. A glass-rich fraction is formed in the process by electrostatically separated aluminum-glass mixture.

The plastics-rich (e.g., 65% mixed polymer resins) fraction is employed in combination with auxiliary low-density polyethylene or oil-extended ethylene-propylene copolymer, and the finely divided glass-rich filler. A filled low-density polyethylene composite employing 25 parts of auxiliary low-density polyethylene, 30 parts of this waste mixed plastics-rich fraction, and 45 parts of finely divided (−200 mesh) waste glass-rich (96% glass) fraction obtained as a residue from the same process. This mixture is intimately mixed and extruded in a heavy duty double-screw extruder to form telephone ducts, pipes and hoses. A composite having 2,700 psi and good impact resistance is obtained.

The residual mixture from the heavy fraction of glass and aluminum are wash-screened to concentrate small pieces of aluminum and glass. The heavy sink portions are passed through a high density organic solvent that separated the mixture of aluminum and glass which floated. The other metals such as brass, lead and zinc alloys are sold. The mixture of aluminum and glass must be processed further to separate these components. This mixture is passed through several sizes of vibrating screens to generate a fine −100+400 mesh size glass-rich fraction containing small (less than 10% by weight) amounts of aluminum. In separate runs, this glass-rich fraction is employed as a reinforcing filler in polyethylene, nylon, polypropylene, coumarone-indene polymers at ratios of 30 to 60 percentages.

EXAMPLE 14

The National Recycling Corporation's process converts municipal refuse into compressed organic solid cubes for uses as a supplementary fuel. The municipal refuse is first shredded and then classified to produce a dry organic-rich light fraction and a glass-rich heavy fraction. The heavy inerts fraction is further processed by the following several mechanical separation steps to recover valuable resources. The second glass-rich fraction comprises approximately 80% glass, 15% non-ferrous metals and metal oxides, and 5% dense plastics, rubbers, and dense cellulosics. Additional milling is performed in several runs, this comminuted glass-rich fraction is employed as a reinforcing filler material in low and high-density polyethylene and elastomers, and oil-extended ethylene-propylene rubber at ratios of 30 to 80 parts by weight.

EXAMPLE 15

Finely divided glass-rich residue whose approximate composition is given in Table 4 was admixed in Shell's Kyraton styrene-butadiene rubber. A 35% by weight of mixed residue, −100+400 mesh, was well-dispersed in 65% by weight of the rubber using a conventional high-shear mixing unit. The compounded rubber is then injection molded at 410° F and injection molding pressure at about 22,000 psi into the forms of shoe heels. Enhanced values of surface friction, compression strength, and shore A hardness was measured compared to the filled (35%) styrene-butadiene thermoplastic rubber.

EXAMPLE 16

Combustion Equipment Associates, Inc., operates a resource recovery process that converts municipal solid refuse into a fuel. One such plant is operational in East Bridgewater, Massachusetts. The incoming refuse is shredded, air classified and the ferrous metals magnetically removed. The heavy fraction is further processed by several mechanical screening and separation steps. The glass-rich residue comprises a mixture of 70% glass, 25% dense plastics and cellulosics, and 5% rocks and dirt, and pulverized to a mesh size (−200 mesh size). This mixed residue is mixed as an inexpensive mechanically reinforcing filler in the polyethylene and ethylene-propylene copolymer elastomer at a one to one ratio by weight and temperature of 340° F and fabricated in a mold.

The light fraction is reshredded and further processed to produce combustible solid fuel which comprises (approximately 87%) fibrous cellulosics and synthetic fibers, (approximately 10%), combustible organics, and glass (approximately 3%). In separate runs, this fibrous-containing-combustible residue is mixed with low-density polyethylene and high-density polyethylene (ratio — 40 parts filler to 60 parts of polymer). The tensile strength and dimensional stability as well as the ultraviolet resistance and weatherability properties of these molded filled polyethylenes are greatly improved.

EXAMPLE 17

The Bureau of Mines' resources recovery system mechanically separates glass, metals, various plastics, and mixed paper from raw, unburned refuse. The initial refuse is reduced in size by a chain-mill operation. The steel is magnetically removed while the non-magnetic fraction is air classified. Further shredding, screening and water elutriation operations provide separate products. A second air-classification step is used to separate the heavier metals, fine glass, dense plastics, and cellulosic wastes from the lighter paper and film plastics. A continuous air gravity table separator removes the plastics, fine glass and non-ferrous metals. The approximate composition of this glass-rich reject fraction is given in Table 9. (Size −50+350). In separate runs, this waste mixed glass-plastics-paper mixture is mixed as a filler with low-density polyethylene, nylon, ethylene-propylene elastomers, oil-extended ethylene-propylene rubbers, styrene-butadiene rubbers (ratio — one to one). Each product exhibits marked increase in mechanical strength and heat distortion temperatures.

TABLE 9

| Waste Component | Approximate Percentage |
| --- | --- |
| Glass | 65 |
| Various plastics, rubbers and mixed paper | 20 |
| Non-ferrous metals and inorganic oxides | 12 |
| Putrescible materials | 3 |

EXAMPLE 18

Low-density polyethylene (40 parts by weight) is intimately admixed with 60 parts by weight of fine waste glass-rich fraction whose composition is listed in Table 9 of Example 17. The dry-blended filled polyethylene is extruded as a melt temperature of about 450° F and allowed to cool in a water bath followed by treatment by an air wiper and pelletizer. The small pellets were automatically bagged in 100 lb. sacks. Alternatively, subirrigation pipes could readily be extruded from the pellets. These sub-soil irrigaton pipes are of a non-pressure type. Colored fence posts and extruded rods for embedment within the soil can be also fabricated.

EXAMPLE 19

Coumarone-indene hydrocarbon resin is blended with 80% by weight of finely divided waste glass-rich residue of a composition set forth in Table 9 of Example 17. The compounded resin is well-dispersed and then fed into a twin-screw heavy duty extruder to produce small diameter (½ − 1 inch) garden hose. Inexpensive fence posts can also be molded.

Table 10 lists the mechanical properties of the highly filled coumarone-indene composite.

TABLE 10

| Mechanical Properties (80% by Weight) of Filled Coumarone-Indene Composites | |
| --- | --- |
| Tensile Strength | 2,200 psi |
| Impact Strength | 2.0 ft-lb/inch |
| Increase of Heat Distortion Temperature over Unfilled Coumarone-Indene resin | 158° F |

The highly filled coumarone-indene structural composite is creep resistant and retains most of its rigidity at 190° F. Greatly improved dimensional stability and physical appearance are observed. The wear resistance and hardness are also very significantly improved.

EXAMPLE 20

To 25 parts of scrap mixture of about 60% by volume polyethylene and 40% by volume of polyvinyl chloride in their finely shredded state, 25 parts of either secondary-grade or virgin off-grade low-density polyethylene is admixed. To this polyethylene-enriched mixture, 50 parts of pulverized glass-rich residue (approximately −200 mesh) of a composition set forth in Table 8.

This mix is intimately mixed in a high-shear mixer and continuously extruded at 460° F in a heavy duty Werner and Pfleider extruder to produce two-inch irrigation pipes.

EXAMPLE 21

Reclaimed rubber, consisting of mostly natural rubber and styrene-butadiene is compounded in a rubber mill with finely divided fillers (ratio 60 parts by weight filler to 40 parts by weight of rubber) from a glass-rich front-end waste residue of approximate composition is given in Table 9 of Example 17 and molded into rubber show heels and battery cases at 335° F. Optical and electron microscope analyses showed good bonding and surface wetting of the well-dispersed mixed fillers in the reclaimed rubber.

EXAMPLE 22

35 parts of hydrocarbon oil-extended styrene-butadiene rubber are compounded with 25 parts of a scrap mixture of 50% polyethylene, 30% polyvinyl chloride, and 10% cellulosics in their finely shredded state. To this mix are added 45 parts of pulverized (−200+400 mesh) particulate filler comprising about 50% glass and inorganic oxides and 50% pyrolyzed char or carbon. This mixture is well mixed and extruded or injection molded. The tensile strength of the highly filled rubber product is 2,700 psi and its impact strength was very good.

I claim:

1. A mixed polymeric composition comprising an intimate mixture of a comminuted filler and an adhesive polymer binder to form a continuous phase firmly bonding said filler particles together, the total polymer resin content comprising from 20% to 75% by weight of said composition, said filler comprising a comminuted fraction from a front-end solid waste system comprising glass, cellulose and its derivatives, inorganic oxides and mixed polymer resins, including a significant quantity of polyethylene and polymer incompatible with polyethylene, said polymer binder comprising a polyethylene-compatible polymer selected from the group consisting of polypropylene, polyethylene, ethylene-propylene rubber, styrene-butadiene rubber, natural rubber, polystyrene, coumarone-indene copolymers, poly(ethylene-vinyl acetate) copolymers, polyisobutylene, and mixtures thereof.

2. A composition as in claim 1 in which said binder comprises at least two resinous adhesive polymers compatible with each other.

3. A composition as in claim 1 in which said binder comprises 10 to 90% by weight of said composition.

4. A composition as in claim 1 in which said binder is selected from the group consisting of polyethylene, ethylene-propylene rubber, and mixtures thereof.

5. A composition as in claim 1 in which no single polymeric resin incompatible with polyethylene is present in the composition in sufficient quantities to form an interface with the binder of sufficient length to provide a significant weakened fault line.

6. A composition as in claim 5 in which no single resin incompatible with polyethylene is present in an amount greater than about 12%.

7. A composition as in claim 1 in which the glass portion of the filler comprises 1 to 80% of the polymer filler.

8. A composition as in claim 1 in which cellulose and its derivatives comprise from 1 to 80% by weight.

9. A composition as in claim 1 in which the majority of said filler is sized in gradations varying from 12 to 600 mesh size and is characterized by non-homogeneous mesh size and individual filler particles with irregular rough shapes.

10. In a process for forming a filled polymeric composition, the steps of
 a. comminuting municipal or industrial solid waste,
 b. classifying the comminuted solid waste into a light fraction and a heavy fraction, said former fraction comprises a majority of combustible organic materials including film plastics, cellulose and its derivatives, said heavy fraction comprising a majority of glass, inorganic oxides, mixed resins, and cellulose and its derivatives, steps (a) and (b) forming a portion of a front-end resource recovery process,
 c. intimately mixing a filler comprising a front-end fraction selected from the group consisting of said light and heavy comminuted garbage fractions in the unpyrolyzed, unincinerated state, said filler including a significant quantity of polyethylene and resin incompatible with polyethylene with sufficient flowable binder, said polymer binder comprising a polyethylene-compatible polymer selected from the group consisting of polypropylene, polyethylene, ethylene-propylene rubber, styrene-butadiene rubber, natural rubber, polystyrene, coumarone-indene copolymers, poly(ethylenevinyl acetate) copolymers, polyisobutylene, and mixtures thereof, to form a continuous phase capable of firmly bonding the filler, the total polymer content comprising from 20% to 75% by weight of said composition,
 d. forming the mixture of step (c) into a desired configuration while in a flowable state, and
 e. solidifying said binder to form a solid composition in which said binder is adhesively bonded to said filler particles.

11. A process as in claim 10 in which said front-end fraction comprises the light fraction.

12. A process as in claim 10 in which said front-end fraction comprises the heavy fraction.

13. A process as in claim 10 in which the heavy fraction comprises a majority of glass and inorganic oxides, and a minor portion of mixed resins.

14. A process as in claim 10 in which said binder comprises at least two resinous adhesive polymers compatible with each other.

15. A process as in claim 10 in which said binder comprises from 10 to 90% by weight of the composition.

16. A process as in claim 10 in which the binder is selected from the group consisting of polyethylene, ethylene propylene rubber, and mixtures thereof.

17. A process as in claim 10 in which the total quantity of no single polymer incompatible with polyethylene is present in sufficient quantities to form an interface with polyethylene of sufficient length to provide a significantly weakened fault line.

18. A process as in claim 10 in which the total quantity of polymer incompatible with polyethylene comprises no greater than 15% by weight of the composition.

19. A process as in claim 10 in which the binder is polyethylene.

20. A process as in claim 19 in which the binder comprises scrap or off-grade virgin polyethylene.

* * * * *